United States Patent
Spencer et al.

(10) Patent No.: US 12,149,612 B2
(45) Date of Patent: Nov. 19, 2024

(54) LOGIN AND CONSENT METHODOLOGY THAT FOLLOWS REST PRINCIPLES AND USES THE OAUTH PROTOCOL WITH ATTESTED CLIENTS

(71) Applicant: CURITY AB, Vårgårda (SE)

(72) Inventors: Travis Lee Spencer, Vargarda (SE); Pedro Henriques Felix, Vargarda (SE); Paulo Renato De Athaydes, Vargarda (SE)

(73) Assignee: Curity AB, Vargarda (SE)

( * ) Notice: Subject to any disclaimer, the term of this patent is extended or adjusted under 35 U.S.C. 154(b) by 776 days.

(21) Appl. No.: 17/367,463

(22) Filed: Jul. 5, 2021

(65) Prior Publication Data

US 2022/0014359 A1  Jan. 13, 2022

(30) Foreign Application Priority Data

Jul. 7, 2020  (EP) .................................... 20184553

(51) Int. Cl.
*H04L 9/08* (2006.01)
*H04L 9/32* (2006.01)
(Continued)

(52) U.S. Cl.
CPC .......... *H04L 9/0825* (2013.01); *H04L 9/3213* (2013.01); *H04L 63/20* (2013.01); *H04L 67/02* (2013.01); *H04L 2463/082* (2013.01)

(58) Field of Classification Search
CPC ..... H04L 9/0825; H04L 9/3213; H04L 63/20; H04L 67/02; H04L 2463/082
See application file for complete search history.

(56) References Cited

U.S. PATENT DOCUMENTS

| 7,587,499 B1 | 9/2009 | Haghpassand |
| 8,364,970 B2 | 1/2013 | Fu |

(Continued)

FOREIGN PATENT DOCUMENTS

| WO | 2013049461 A3 | 4/2013 |
| WO | 2016160978 | 10/2016 |

(Continued)

OTHER PUBLICATIONS

Jones, Michael, John Bradley, and Hannes Tschofenig. Proof-of-possession key semantics for JSON Web Tokens (JWTs). No. rfc7800. 2016. (Year: 2016).*

(Continued)

*Primary Examiner* — Kambiz Zand
*Assistant Examiner* — Afaq Ali
(74) *Attorney, Agent, or Firm* — Miller Nash LLP

(57) ABSTRACT

Authentication of a user of an OAuth client by an OAuth authorization server, comprising exposing an authentication state machine, where the states of the state machine are hypermedia-based representations of login resources, and transitions between states are represented by hypermedia links, wherein the authentication state machine is exposed to the client by an API adhering to the principles of REpresentational State Transfer (REST). When the final state of the state machine has been reached, a secondary access token is issued to the client, thereby authenticating the user, wherein hypermedia representations which are sent to the client are encoded so as to be readily parsable by the client.

16 Claims, 5 Drawing Sheets

(51) Int. Cl.
*H04L 9/40* (2022.01)
*H04L 29/06* (2006.01)
*H04L 29/08* (2006.01)
*H04L 67/02* (2022.01)

(56) References Cited

U.S. PATENT DOCUMENTS

| | | | |
|---|---|---|---|
| 8,613,055 | B1 | 12/2013 | Tomilson et al. |
| 8,972,590 | B2 | 3/2015 | Haghpassand |
| 9,479,494 | B2 | 10/2016 | Krishnaprasad et al. |
| 9,641,503 | B2 | 5/2017 | Mehta et al. |
| 9,853,962 | B2 | 12/2017 | Krishnaprasad et al. |
| 9,923,905 | B2 | 3/2018 | Amiri et al. |
| 9,998,471 | B2 | 6/2018 | Haghpassand |
| 10,255,061 | B2 | 4/2019 | Lander et al. |
| 10,261,836 | B2 | 4/2019 | Bansal et al. |
| 10,263,947 | B2 | 4/2019 | Vats et al. |
| 10,454,915 | B2 | 10/2019 | Abdul et al. |
| 10,454,940 | B2 | 10/2019 | Lander et al. |
| 10,579,367 | B2 | 3/2020 | Lander et al. |
| 10,585,682 | B2 | 3/2020 | Jain et al. |
| 10,705,823 | B2 | 7/2020 | Pitre et al. |
| 10,757,165 | B2 | 8/2020 | Gangadharan et al. |
| 10,848,543 | B2 | 11/2020 | Lander et al. |
| 10,931,656 | B2 | 2/2021 | Carru et al. |
| 11,012,441 | B2 | 5/2021 | Totale et al. |
| 11,146,565 | B2 | 10/2021 | Alameh et al. |
| 11,159,517 | B2 | 10/2021 | Jain et al. |
| 2014/0090041 | A1 | 3/2014 | Kim et al. |
| 2014/0189808 | A1 | 7/2014 | Mahaffey et al. |
| 2014/0282881 | A1* | 9/2014 | Li .................. H04L 67/02 726/4 |
| 2015/0058960 | A1* | 2/2015 | Schmoyer .......... H04L 63/0807 726/8 |
| 2015/0074407 | A1 | 3/2015 | Palmeri et al. |
| 2016/0294952 | A1* | 10/2016 | Bodell ............... H04L 51/046 |
| 2017/0063931 | A1 | 3/2017 | Seed et al. |
| 2017/0223057 | A1 | 8/2017 | Amiri |
| 2018/0288026 | A1* | 10/2018 | Callaghan ......... H04L 9/3226 |
| 2019/0103968 | A1* | 4/2019 | Srinivasan .......... H04L 9/0894 |
| 2020/0007530 | A1* | 1/2020 | Mohamad Abdul ............ H04W 12/084 |
| 2020/0076794 | A1* | 3/2020 | de Boer ............. H04L 9/3213 |
| 2020/0226242 | A1 | 7/2020 | Balaraman et al. |
| 2020/0252364 | A1 | 8/2020 | Ande et al. |
| 2020/0358777 | A1 | 11/2020 | Threlkeld |
| 2020/0409934 | A1 | 12/2020 | Bar Oz et al. |
| 2021/0160231 | A1 | 5/2021 | Kumar et al. |
| 2021/0390170 | A1 | 12/2021 | Olden et al. |
| 2022/0014517 | A1 | 1/2022 | Jain et al. |

FOREIGN PATENT DOCUMENTS

| | | |
|---|---|---|
| WO | 2018053122 | 3/2018 |
| WO | 2018053258 | 3/2018 |

OTHER PUBLICATIONS

Ericsson et al., "RESTful Design for Internet of Things Systems; draft-irtf-t2trg-rest-iot-06. txt", Restful Design for Internet of Things Systems; draft-irtf-t2trg-rest-iot-06.txt; Internet-Draft: Network Working Group, Internet Engineering Task Force, IETF; Standardworkingdraft, Internet Society, No. 6, May 11, 2020 (May 11, 2020), pp. 1-34, XP015139516, Retrieved from the Internet: URL:https://tools.ietf.org/html/draft-i rtf-t2trg-rest-iot-06 [retrieved on Jun. 17, 2021].

\* cited by examiner

LOGIN AND CONSENT METHODOLOGY THAT FOLLOWS REST PRINCIPLES AND USES THE OAUTH PROTOCOL WITH ATTESTED CLIENTS

RELATED APPLICATION

This application claims priority to European Patent Application No. EP20184553, filed 7 Jul. 2020, which is incorporated by reference herein in its entirety.

TECHNICAL FIELD

The present embodiments relate to website login and, in particular, to an OAuth authorization server for issuing access tokens to attested clients, and to a method performed by such a server.

BACKGROUND

Login and authentication are often integrated into applications using the OAuth 2.0 Framework ("OAuth") and the OpenID Connect protocols. These, in turn, use the HTTP standard for message transfer. The contents of these are encoded in HTML and rendered by a Web browser. As a result, actual people are able to login by operating a Web browser that renders these HTML-encoded representations of the login resources, regardless of the form of authentication (i.e., the credential) that is used.

Unrelated to login, OAuth, and OpenID Connect, a set of principles has emerged for creating network-based software that is interconnected using HTTP. This architectural style is known as REpresentational State Transfer (REST). An entity that exposes data and/or capabilities to other actors within a network in a way that adheres to these principles is known as a Web Application Programming Interface (AKA an HTTP API or Web API or, if understood from a certain context, simply an API).

The OpenID Connect standard states in its preamble that the protocol "enables Clients to verify the identity of the End-User based on the authentication performed by an Authorization Server . . . in an interoperable and REST-like manner." Here, the manner in which login is done is said to be "REST-like" because the protocol does not adhere to all principles of REST, and only part of the protocol is defined as a Web API. The way in which complete adherence to the principles of REST can be achieved is undefined by the specification.

The clients referred to in the above quote are often Web- and mobile-device-based applications. In the former case, this has traditionally meant that the Web application is hosted on a Web server. This deployment model allows a client to authenticate itself to an OAuth authorization server and the framework defines mechanisms for doing this. More and more, however, both Web- and mobile-device-based applications are being deployed in a way that they cannot authenticate themselves to an authorization server. Web applications are built as Single Page Applications (SPA) where any user of the Web page can view the source code (including any credential) of the entire application in their Web browser; likewise, mobile applications can be readily decompiled, and credentials deployed with them can be obtained. This state of affairs means that clients communicating with an authorization server cannot be attested to be authentic; they are effectively "public" (i.e., unauthenticated) clients.

Because OAuth and OpenID Connect 1) do not adhere to all REST principles, 2) do not define how to authenticate a person with any particular credential, and 3) are tightly bound to the use of a browser by the authenticated user, many challenges have arisen which the inventors have sought to overcome. For instance, clients running on mobile applications must delegate authentication to a browser running on that device. This leads to a suboptimal User Experience (UX) and can pose a barrier to authentication for many users. A subset of the OAuth protocol referred to as the "Resource Owner Password Credentials Grant" is sometimes shoehorned into an implementation to provide API-driven login. This is suboptimal, however, because it cannot support authentication with other kinds of credentials besides a password (and, thus, does not support multiple factors of authentication, MFA, without applications having to resort to custom solution outside the specification), it only defines a simple request/response protocol, and it does not adhere to all of the REST principles.

Document US 2020/0036692 discloses a method and system for access control, intended to improve the security of an API. However, this method does not provide attestation of a client, and requires out-of-band authentication. The method does not follow the OAuth nor OpenID Connect protocols and does not adhere to REST. As a consequence, any implementation will require special coding of the client.

Document U.S. Pat. No. 8,613,055 provides a mechanism for controlling login within the OAuth framework. However, this mechanism is not a complete API for user authentication—merely credential selection.

Document US 2014/0189808 discloses a system which allows multi-factor authentication, but only to access a cloud storage of a username/password. Also, this document fails to disclose any REST API, and also any client attestation under the OAuth protocol.

Document US2020/0007530, finally, discloses a system where devices are enrolled in a "circle of trust" and a "Cloud Gate" is used to authorize users to a REST API. A client application authenticates to an authorization server using a JWT assertion as described in RFC 7523. This signature proves the client application's possession of a private key, but it is not tied to an attestation of the client application per se. As a result, the assertion proves possession of a key and the client applications membership within the circle of trust, but this key does not necessarily originate from an unaltered client application (i.e., an unattested one). The application could be a clone or could have been proxied by a third-party running on the device or by a man-in-the-middle.

Accordingly, there is a need of an OAuth authorization server that provides a REST API that authenticates users operating attested client applications.

SUMMARY

It is an object of the present embodiments to overcome the shortcomings of the prior art, and to provide an improved authentication/login method which complies with OAuth and enables a REST API.

According to a first aspect of the embodiments, this and other objectives are achieved by a method for authenticating a user of an OAuth client by an OAuth authorization server, the method comprising receiving a client attestation token, CAT, from the client using the extensibility mechanisms set forth in the OAuth assertion framework, receiving, together with the CAT, a public key, PK, and proof of possession, PoP, of a private key paired with the PK, verifying the CAT, issuing an API access token, AAT, to the client, which AAT is associated with the verified CAT, receiving the AAT in return, together with a PoP of the private key, exposing an authentication state machine, where the states of the state machine are hypermedia-based representations of login resources, and transitions between states are represented by hypermedia links, wherein the authentication state machine is exposed to the client by an API adhering to the principles of REpresentational State Transfer (REST), sending to the client a hypermedia representation of an initial state of the state machine, repeating the following steps until a final state of the state machine is reached:

a) receiving an HTTP request from the client for one of the hypermedia representations in the state machine, said request being based on user interaction or automated logic with the client,
 b) transitioning to a new state as a result of the received request, if the request complies with the predefined requirements necessary to exit the current state, and
 c) sending to the client a hypermedia representation of the new state, and when the final state of the state machine has been reached, issuing a secondary access token, AT, to the client, thereby authenticating the user, wherein hypermedia representations which are sent to the client are encoded so as to be readily parsable by the client.

According to a second aspect of the embodiments, this and other objects are achieved by an OAuth authorization server including functions configured to perform the method of the first aspect of the embodiments.

The approach according to the present embodiments involves an OAuth compliant attestation of a user device, which is encoded in a CAT (client attestation token). The client attestation is maintained throughout the authentication process by sending proof of possession of the private key associated with the attestation. The client attestation substantially reduces the risk of security breaches by clones or proxies, which is an inherent risk in prior art authentication such as the one discussed in US 2020/007530.

After this attestation, the actual authentication process takes place in a hypermedia state machine adhering to the principles of REST. As a result, the entire authentication method can be enabled by an API which also will adhere to REST.

The usage of negotiated hypermedia representations is typical of many REST APIs, and is not novel, per se. However, it is only the present inventors that have realized that the OAuth framework provides a suitable environment for a login/authentication state machine based on such negotiated hypermedia representations to enable a REST login API. Specifically, the OAuth framework itself leaves the authentication method undefined, and does not suggest the use of a hypermedia representation state machine according to the present embodiments.

By providing a login state machine as a REST API, the specific authentication methods, including the chosen credentials, may be adopted without requiring any client-side modifications. This is one of the main benefits of the principles of REST, in the strict sense.

For example, the authentication state machine may provide for user authentication using a plurality of credentials, including single and multiple factors of authentication.

The states of the state machine are preferably represented as universally identifiable resources, and the links may then be expressed as Uniform Resource Identifiers (URIs). This is a practical and efficient implementation, as URIs are a well-known concept accessible to most software engineers.

The hypermedia representations may be encoded in any format which may easily be parsed by the client. Suitable examples are JavaScript Object Notation (JSON) and eXtensible Markup Language (XML). Especially JSON is known to be a very easily parsed format, and almost every client will have easy access to a JSON parser. Selection of an available format (i.e., content type) may be based on client/server HTTP content negotiation.

In some embodiments, the client and server are configured to communicate using the OpenID protocol.

In some embodiments, the CAT is obtained by a software component installed on the OAuth client by receiving a CAT request from the OAuth client application, requesting an attestation from an attestation system available within the execution environment of the OAuth client, receiving an attestation from the attestation system, encoding the attestation in a CAT, and posting the CAT to the OAuth client application over a secure channel. This encoding may be done by way of a token exchange performed with an authorization server.

The "attestation system" can be any system which can obtain information about the client and its execution environment with a high level of confidence. In one embodiment, the attestation system is a web browser, which is instructed to execute a Secret Instruction Set (SIS) program. In another embodiment, the attestation system is the keystore system available on Android operating systems. In yet another, it is the DCAppAttestService available on iOS operating systems.

DETAILED DESCRIPTION OF CURRENTLY PREFERRED EMBODIMENTS

Systems and methods disclosed in the following may be implemented as software, firmware, hardware or a combination thereof. Certain components or all components may be implemented as software executed by a digital signal processor or microprocessor or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Figure 1:
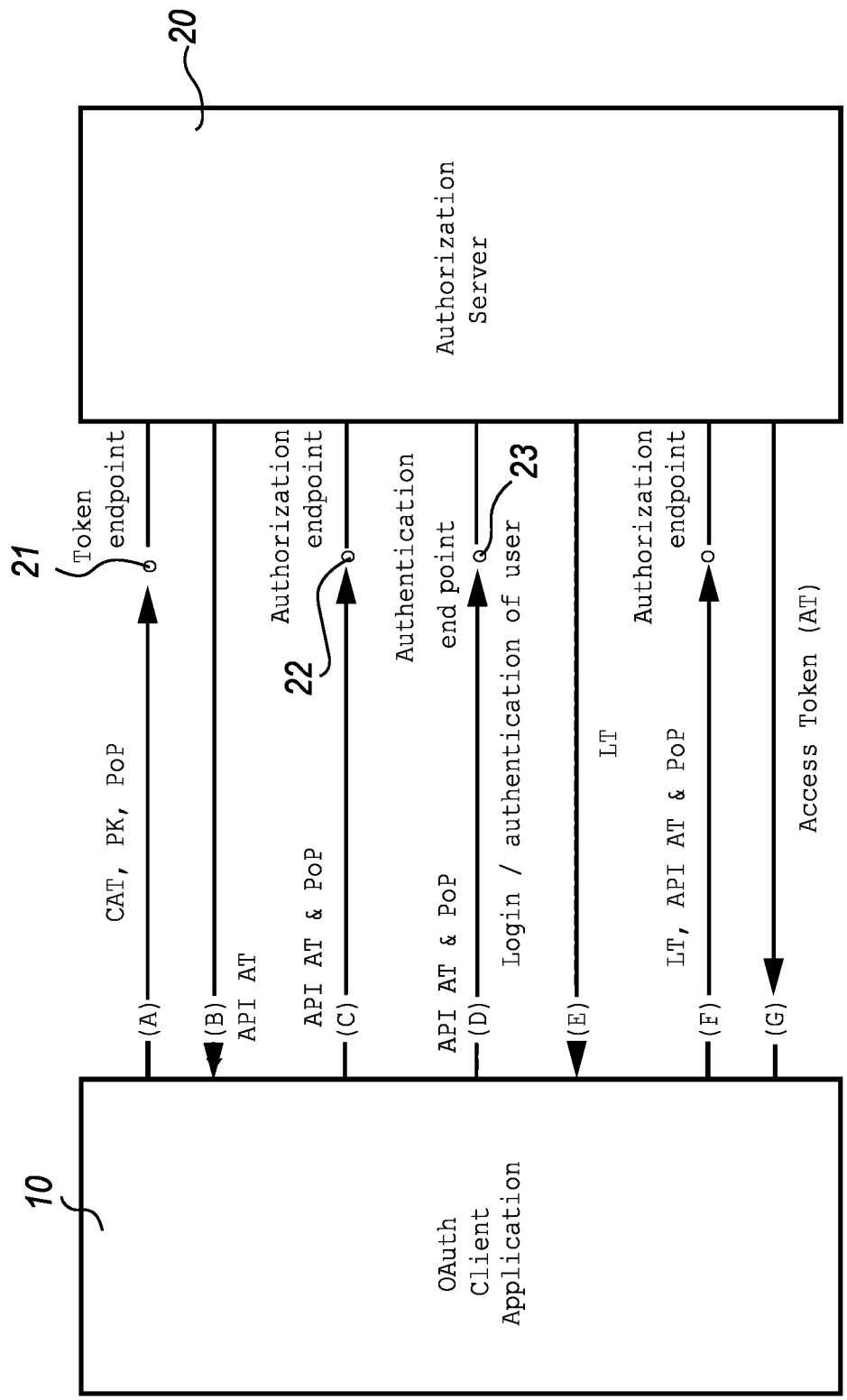
FIG. 1 shows the interaction between an OAuth client application and an OAuth authorization server according to an embodiment of the embodiments.

FIG. 1 illustrates 7 steps (A-G) of communication which take place between an OAuth client application, also referred to as a client, 10 and an OAuth authorization server 20. The server 20 has a set of endpoints, including a token endpoint 21, an authorization endpoint 22, and an authentication endpoint 23.

OAuth as used here refers to the OAuth 2.0 Framework, which is an open-standard authorization protocol. It describes how unrelated servers and services can allow authenticated access to the assets provided by the servers and services without sharing the initial, related, single login credential. It allows the servers or applications to access the user's information on other websites or services without the user having to give their passwords. OpenID, as mentioned previously, is layered atop OAuth as a decentralized authentication protocol that allows users to be authenticated using a distinct service, in a similar manner as defined in OAuth.

As discussed above, the Representational State Transfer (REST) principles have emerged separate from these two protocols, and these two protocols do not adhere to REST principles. The embodiments here use the OAuth framework to employ a login/authentication state machine that adheres to REST principles by enabling a REST login API. The embodiments here provide an evolvable REST login API that does not necessitate client-side modifications once that client is programmed to interoperate with the API.

One should note that the OAuth client application may or may not be a "web browser," meaning an application that renders HTML encoded-representations of login resources, regardless of the authentication used. The client may also be a mobile, or other, application that may use the embodiments to avoid having to utilize a web browser mentioned above, while adhering to the REST principles. In the diagrams, the OAuth client application connects to the OAuth authorization server through the internet or other network, not shown.

In step A, the OAuth client application 10, in possession of a Client Attestation Token (CAT) obtained by the process described below, uses the OAuth "Client Credential Grant" as a representation of the appropriate consent. This CAT is here a JSON Web Token which is verified using the Assertion Framework for OAuth 2.0 Client Authentication and Authorization Grants. This CAT, accompanied by a Public Key (PK) and the client's use of the associated private key (a Proof of Possession, PoP), is sent to the token endpoint 21 of the server 20.

In step B, the token endpoint 21 verifies the CAT, and issues an API Access Token (API AT or AAT), relating it to the PK, so that only a client is possession of the associated private key can present this AAT during the continued login process.

In step C, the client 10 performs a proof of possession of the private key that was bound to the API AT and sends this PoP and the API AT to the authorization endpoint 22 of the server 20. This is the entry into a login state machine, and the response is a root object (an initial state of the state machine), as described below. The state machine is embodied in the server 20 and exposed to the client 10 in the authentication endpoint 23.

In step D, the client 10 again performs a PoP and sends this with the API AT to one of the actions in the list of actions that can be performed on the resource (representing the current state of the state machine). The PoP in combination with the API AT ensures that the communication is still from the attested client. The action in step D may, under certain conditions, lead to traversing to a new state in the state machine. This continues for any number of steps. It may result in errors (not depicted in FIG. 1). If the user traverses to the final state of the state machine (meaning they are successfully authenticated by some means), a Login Token (LT) is issued in step E.

In step F, the client 10 sends the LT, another PoP and the API AT to the authorization endpoint 22.

In step G, the authorization server 20 finally issues it a secondary Access Token (AT) (distinct and for a wholly separate purpose than the API AT). This secondary AT may or may not be bound to the private key which the client proved possession of during the login process just described.

Figure 2:
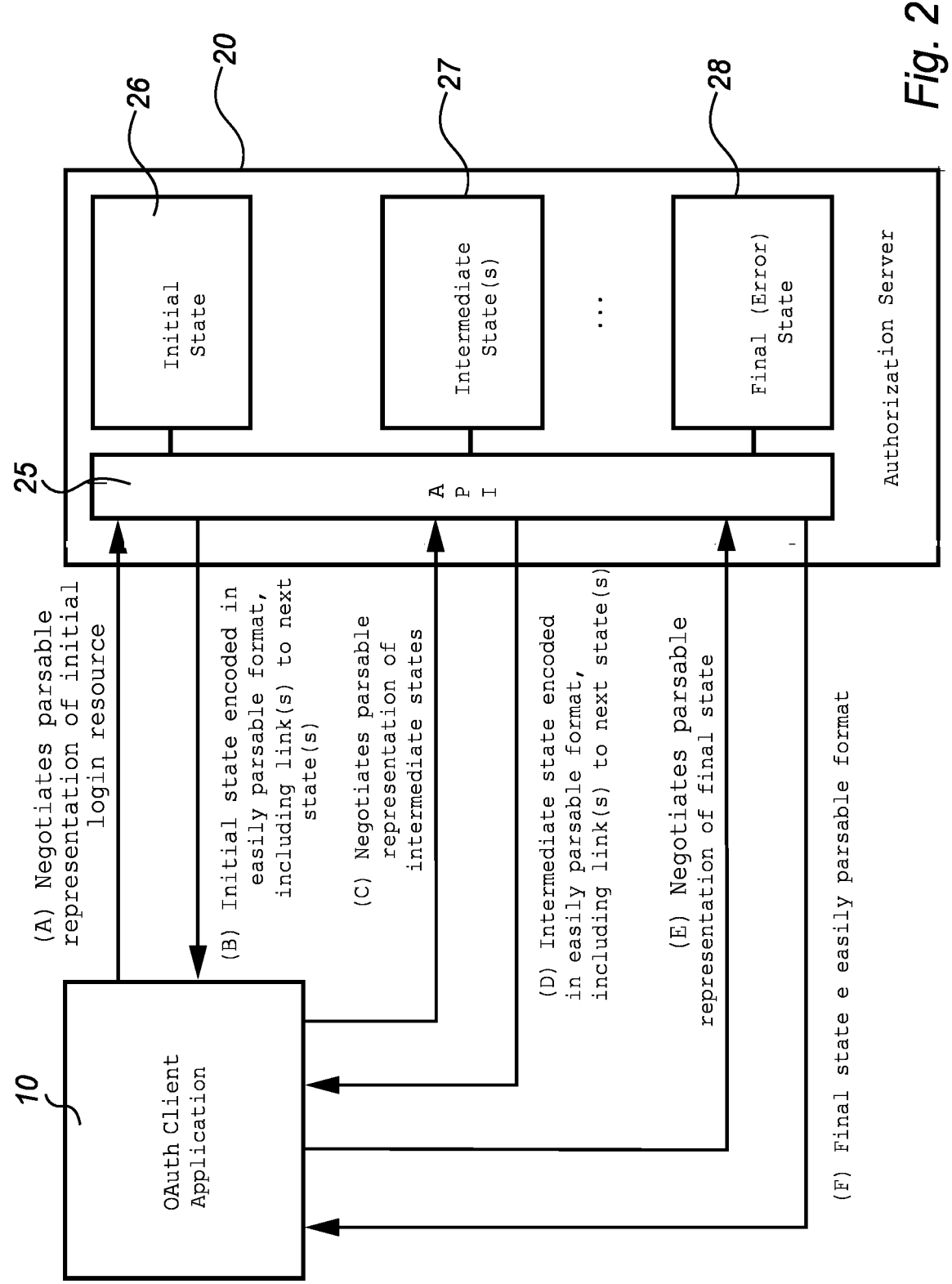
FIG. 2 shows the interaction between the OAuth client application and the REST API exposed by the OAuth server.

With reference to FIG. 2, the authorization server 20 exposes a state machine which forms an API 25 that follows all of the principles of REST (steps C-G in the process depicted in FIG. 1). In particular, the API 25 provides access to resources using Universal Resource Identifiers (URIs), representations of those resources are specified using media types, and the connections between those resources are provided using hypermedia controls, namely links. The REST API 25 facilitates authentication of a person using any mechanism. In other words, the actual credential used to identify and verify a person can be extended by any programmatic method. The addition of new credential types may require extensions to the content returned from the API 25 (step D), but the representation is extensible and can support this. This makes the API 25 universal and able to be augmented with new login methods. It is possible for clients 10 of the API to tolerate this kind of change because they are hypermedia clients that follows link relations in the same manner for either new or existing login resources.

The various representations of login and consent resources (states in the state machine) allows client applications besides simple HTML Web browsers to more easily guide a user through the process of extensible and dynamically-defined authentication and consent steps. This could involve single or multiple factors of authentication. It also may be based on user interaction or automated logic within the client. The dynamism of the process is made possible, in part, by the invented hypermedia representation of the login resources described below. For example, the login resources may invoke a user interface allowing user interaction, including standard interface objects like check-boxes, entry fields, etc.

To simplify the traversal of this state machine by the API client, the API preferably represents each resource (a state in the state machine) in a syntax that is easy for clients to parse and process. In one example, the resource formatting uses JavaScript Object Notation (JSON) to create a representation of a login resource. This representation (with any potential metadata) allows a client to manipulate the state of that resource as necessary for that client and/or the user of that client.

As previously described, the initial invocation of the API is done using the OAuth and/or OpenID Connect standards. According to embodiments of the present embodiments, however, the process includes the use of HTTP-based content negotiation, where the client specifies that it wishes to interact with the embodiments using a JSON-based content type. An example of this is shown in listing 1 and 2:

| Listing 1: Example HTTP request to the API using content negotiation to request a login resource |
|---|
| 1.01\|     GET /dev/authn/register/create/example1 HTTP/1.1 |
| 1.02\|     Host: example.com:8443 |
| 1.03\|     Accept: application/vnd.curity.auth+json |
| 1.04\|     Authorization: DPoP (... API AT ...) |
| 1.05\|     DPoP: (... PoP ...) |

| Listing 2: Example HTTP response from the API that shows the representation of a state in the login state machine |
|---|
| 2.01\|     HTTP/1.1 200 OK |
| 2.02\|     Content-Type: application/vnd.curity.auth+json; charset=utf-8 |
| 2.03\| |
| 2.04\|     { |
| 2.05\|       "type": "example-transaction", |
| 2.06\|       "properties": { |
| 2.07\|         "autostarttoken": "2f0ddb78-1d1a-48e4-9e8a-2ba13cf0ca3b", |
| 2.08\|         "status": "pending" |
| 2.09\|       }, |
| 2.10\|       "actions": [ |
| 2.11\|         { |
| 2.12\|           "template": "form", |
| 2.13\|           "kind": "cancel", |
| 2.14\|           "model": { |
| 2.15\|             "href": "https://example.com:8443/dev/authn/authenticate/example1/cancel", |
| 2.16\|             "method": "POST", |
| 2.17\|             "type": "application/x-www-form-urlencoded", |
| 2.18\|             "actionTitle": "Cancel" |
| 2.19\|           } |
| 2.20\|         } |
| 2.21\|       ], |
| 2.22\|       "links": [ |
| 2.23\|         { |
| 2.24\|           "href": "https://example.com:8443/dev/authn/authenticate/example1/poller", |
| 2.25\|           "rel": "self" |
| 2.26\|         }, |
| 2.27\|         { |
| 2.28\|           "href": "example:///?autostarttoken=2f0ddb78-1d1a-48e4-9e8a-2ba13cf0ca3b&redirect=null", |
| 2.29\|           "rel": "example-app-launch", |
| 2.30\|           "title": "Start the Bank security app" |
| 2.31\|         } |
| 2.32\|       ] |
| 2.33\|     } |

The negotiated hypermedia content type, which represents the login and consent steps within the authentication process exposed by the REST API 25, has a root object, which may be seen as the initial resource or state 26 of the state machine. Obtainment of this root object (initial resource/state) via the API 25 and using it to traverse the state machine exposed via the API 25 is shown in FIG. 2.

In step A, the client 10 (which is a mobile app, a Web browser or other kind of user agent) invokes the API 25, specifying which representations of a resource it prefers (e.g. JSON-based as in listing 1 above). The embodiments may then return a single or list of supported media types (i.e. representations). In the case of a list of supported media types, the client may determine which of these is preferred and makes subsequent requests for this kind of content (i.e. content type).

Step A in FIG. 2 depicts the "content negotiation" discussed above, which leads to an agreement of the hypermedia content type to use to represent the resources. As is clear from FIG. 2, such a content negotiation takes place for every request to the API 25. It is noted that in practice, there may be an initial negotiation which the client 10 performs to determine that a certain kind of content is supported by the server 20 and it then requests that type of content for the entire process. However, even if this is the case, some indication of the type of content the client 10 prefers will need to take place for every request.

In step B, the API 25 returns a representation of the initial state, including links and actions with options to progress in the state machine. These links represent transitions in a state machine. The server 20 maintains this state machine (the code governing the conditions for state transitions) and makes it available via the API (25). The API 25 provides the client 10 with the ability to traverse this state machine. States may be an initial state 26, intermediate states 27, and terminal states 28 (both error states and non-error final states). As mentioned above with reference to FIG. 1, the entry and exit actions from the state machine utilize the framework defined by OAuth.

The initial state mentioned above has four properties: 1) a type, which defines the meaning of the current representation, including schematic and semantics for the sub-properties; 2) sub-properties which represent specific fields and are extensible and typed based on the value of the type property; 3) actions which is a list of actions that can be taken based on the representation; and 4) links which are related resources.

The type that a representation may assume is defined in an extensible catalog of the API specification. This includes, but is not limited to, such types as authentication step, active device, polling status, OAuth authorization response, device activation, etc.

Sub-properties contain information about the represented resource. For instance, on a device activation response, the activation code is present as a sub-property. On an OAuth 2.0 authorization response, the code and the state are present as sub-properties. On a polling response, sub-properties are used to inform the client of the outcome. Generally speaking, these are used to encode any information that isn't an action or a link.

The actions list is composed of zero or more objects. Each object includes the fields 1) template, which the type of user interaction defined by the action; 2) kind, which indicates to the client additional information about the type of user interface that can be rendered in order to improve the UX; and 3) model, which is a set of fields specific to the defined template.

The link list is composed of one or more objects. Each represents a link to a related resource. Each link object includes the fields 1) href, a URI for the link target; 2) rel, which indicates the relationship of the current resource to the linked one; 3) title, which is a label describing the associated resource; and 4) the kind, which may include additional information about the related resource and can optionally be used by a client to provide an improved UX.

Figure 3:
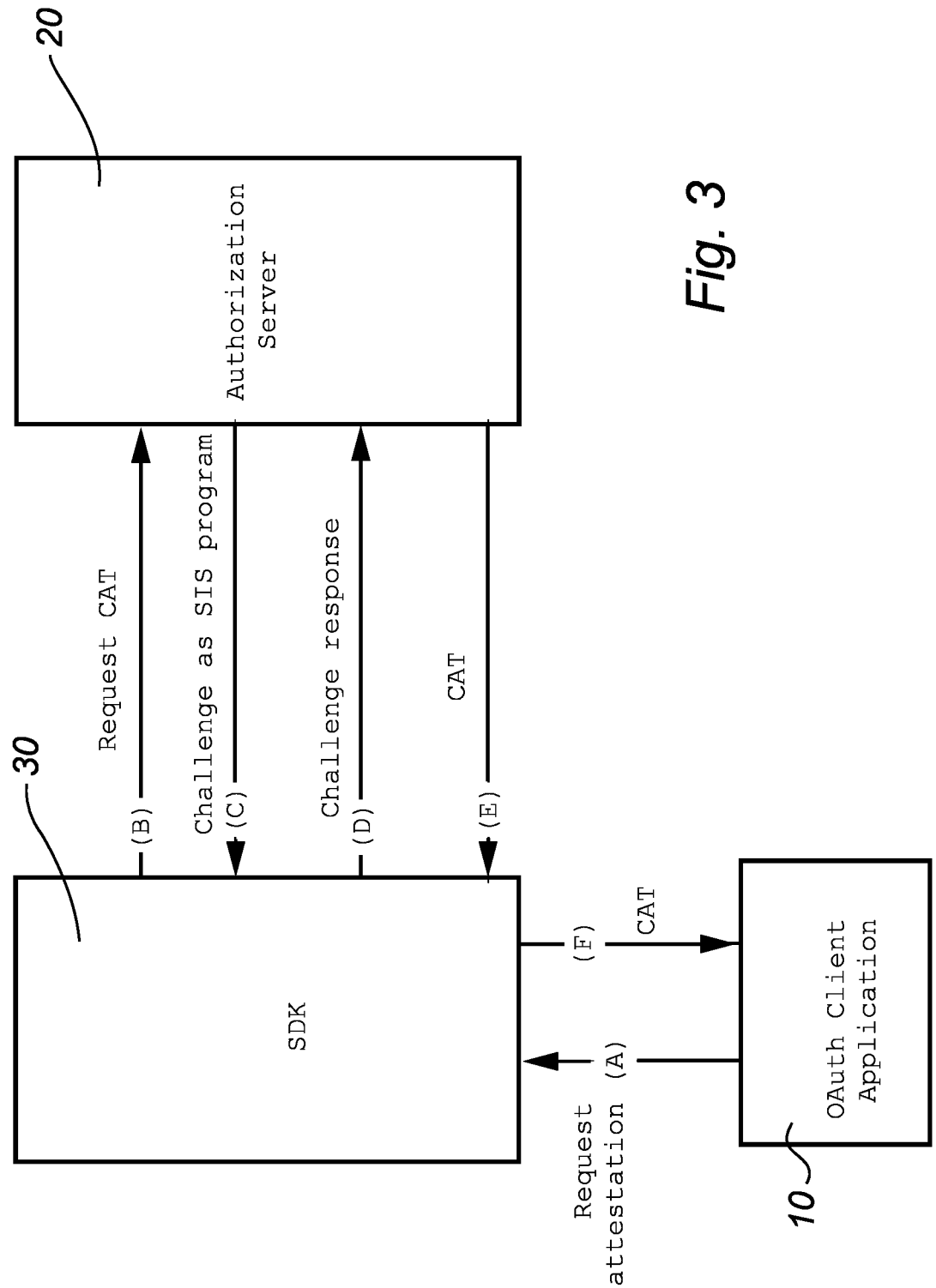
FIG. 3 shows an example of a web-based OAuth client application obtaining a CAT.
Figure 4:
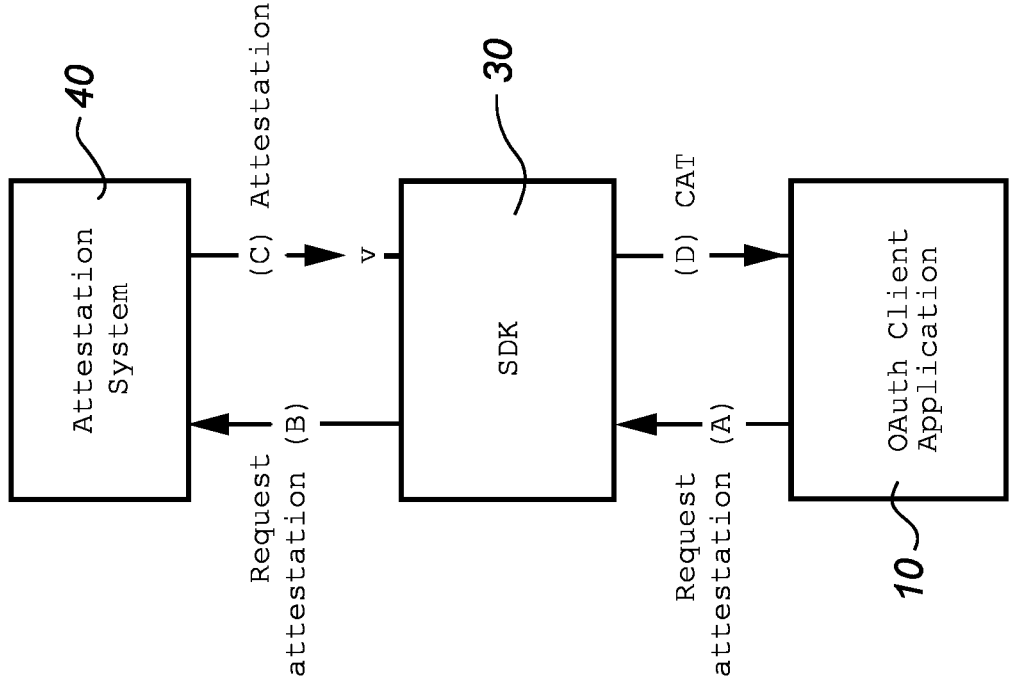
FIG. 4 shows an example of a generic OAuth client application obtaining a CAT according to an embodiment of the embodiments.

Another important aspect of the API is that authenticated clients may and public clients (again, those that do not authenticate) must attest to their identity by using features of the environment in which they are executing. This attestation is required in order to obtain an API Access Token (API AT in FIG. 1). Only once the client has obtained an API AT can it interact with the API and start the authentication of a user. In order to obtain an API AT, the client uses a standard OAuth flow (the so called "Client Credentials Grant"), authenticating with another token that attests to its identity which is transported to the server 20 in a manner specified by the OAuth assertion framework. This use of the CAT is shown in FIG. 1 as well. How a Web-browser-based client obtains a CAT is shown in FIG. 3 below, and how this is done by non-Web-browser-based clients is shown in FIG. 4. Once the client authenticates using the CAT and obtains an API AT, every API call must contain a Proof of Possession (PoP) of a private key that only the client has. This ensures that an attested client cannot start the login process and an unattested one finishes it. The mechanism for providing a proof of possession follows the OAuth DPOP protocol, mutual TLS, token binding, or similar techniques for doing so.

In more detail, the manner in which the Web-browser-based client obtains a CAT is shown in FIG. 3 where a software component, here a Software Development Kit (SDK), installed on the client starts the attestation procedure by requesting a Secret Instruction Set (SIS) program from the authorization server. The SDK uses the browser's "fetch API" to communicate with the server, following the HTTP-based protocol described. The format of a SIS program is defined below. It consists of a SIS and has the objective of obfuscating the procedure by which the SDK probes its environment and reports the results to the authorization server, so that an attacker cannot reverse-engineer the procedure in a feasible amount of time. The SDK executes the SIS program in order to generate a set of claims that it will present to the authorization server for evaluation. If the authorization server approves the claims made by the SDK, it issues a CAT which the SDK sends to an OAuth client running in the same environment for the purpose of authenticating itself (as previously described).

With reference to FIG. 3, the following steps are required for a Web-browser-based client to obtain a CAT:

In step A, the OAuth client application 10 requests attestation from the SDK 30.

In step B, the SDK 30 requests a CAT from the authorization server 20.

In step C, the authorization server 20 sends a challenge in the form of a SIS program to be executed by the SDK 30 on behalf of the client 10.

In step D, after executing the SIS program, the SDK 30 sends the encrypted result to the server 20 as a challenge response.

In step E, the server 20 verifies the payload sent by the SDK 30 and if the client environment is approved, issues a CAT.

In step F, the SDK 30 posts the CAT to the OAuth client application 10 via a private, secure channel.

Steps C and D may be repeated more than once at the discretion of the authorization server 20. After obtaining the CAT, the OAuth client application 10 can proceed to step A of FIG. 1.

A SIS is used by the authorization server to request information from the client (typically using an SDK) in such a way that only perfect execution of the client code within a browser implementing several APIs could allow the client to generate the payload that the authorization server will accept as valid, and which should contain claims regarding the environment where the client is running. Once the client's execution environment is proven to be an actual browser (by executing the SIS correctly), other browser technologies are utilized to attest that the client is indeed the one it is claiming to be (e.g., by applying the "same origin policy"). This ensures that the invented API can only be used by authorized client applications running in trusted environments (and hence subject to several restrictions which make the use of the invented API secure) and not malicious counterfeits.

This SIS is designed in a manner that:

- Is difficult to reverse-engineer by looking at binary representation that is provided to the client (via an SDK).
- No easy patterns can be found by looking at the transmitted data.
- Tracing execution in a debugger will not yield significant information.
- Observation of inputs and outputs is not sufficient to determine the algorithm being utilized.
- Programs can be randomly generated easily.
- The authorization server can generate random programs that provably generate the encryption key and a set of claims that will attest to the client's identity.
- The client can execute it correctly in a browser.
- Only the authorization server can reliably reverse the procedure to obtain the claims being made by the client at the end of program execution (even without encryption).

SIS is a byte code language. Its execution model is that of a stack machine. When an instruction is executed, it may read data from the stack or the environment, modify the order of elements on the stack, and push data onto the stack. An example of a SIS program is shown in listing 3:

Listing 3: A SIS program example

```
3.01|  read  #x     ; read #x (userAgent) and put it on the stack
3.02|  read  #y     ; read #y (local timezone) and put it on the stack
3.03|  swap         ; swap the 2 top elements on the stack
3.04|  b64          ; base64-encode the top element on the stack
3.05|  dup          ; duplicate the top element on the stack
```

-continued

Listing 3: A SIS program example

| 3.06| | rand | ; put random data on the stack |
| 3.07| | push 12345678 | ; pushes 12345678 onto the stack |
| 3.08| | push 87654321 | ; pushes 87654321 onto the stack |
| 3.09| | xor | ; XOR the two top elements on the stack |

Not all clients are web-based, however. For that reason, the embodiments can use any platform-specific system to perform attestation, not only the one described above. FIG. 4 illustrates how an OAuth client application 10 may obtain a CAT using a generic attestation system 40 available within the execution environment of the client 10. This is effectively a generalization of the process in FIG. 3.

A method can only be used as a generic attestation system with the present embodiments if it a) is able to interface with a software component installed on the client application, here again referred to as a Software Development Kit (SDK) 30, or perform the like functionality, b) can obtain information about the client and its execution environment with a high level of confidence, and c) can attest to whether the client is allowed to run in such an environment.

Similar to FIG. 3, in step A, the OAuth client application 10 requests attestation from a software component installed on the client, namely, the SDK 30. In step B, the SDK requests attestation from the provided attestation system 40 available in the execution environment of the client.

In step C, the attestation system 40 provides some form of attestation which is encoded in a CAT by the SDK 30.

Steps B and C provides a generic attestation effectively substituting for the SIS-based challenge response performed in steps B-E in FIG. 3.

In step D, which is similar to step F in FIG. 3, the SDK posts the CAT to the OAuth client application 10 via a private, secure channel. After obtaining the CAT, the OAuth client application 10 can proceed to step A of FIG. 1.

Figure 5:
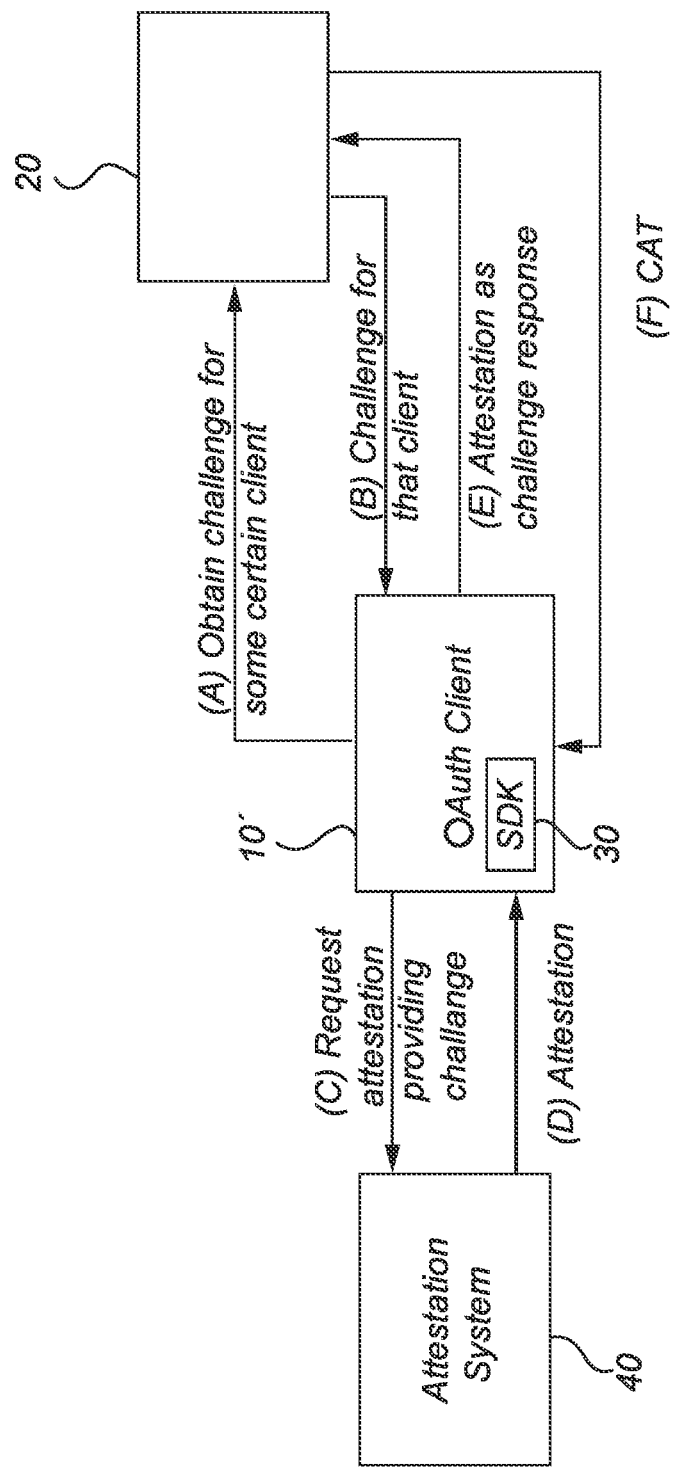
FIG. 5 shows obtaining a CAT according to another embodiment.

FIG. 5 shows a further embodiment wherein the SDK 30 is compiled (embedded) into the OAuth Client application 10', and thus not illustrated as a separate module. To accomplish this encoding of the CAT, the OAuth client application 10' begins by requesting a challenge in step A. This is similar to step B in FIG. 3. Like step C in FIG. 3, the Authorization server 20 replies with a challenge; this is shown in step B of FIG. 5. The client 10' (by way of the embedded SDK 30) then request attestation in step C from the attestation system 40. The client is attested in step D. This resulting attestation is presented to the authorization server in step E of FIG. 5. This is then encoded in a CAT in step F. This final step F of FIG. 5 is similar to step E in FIG. 3.

This ability to interoperate with any attestation system is important because mobile platforms and some environments wherein the OAuth client executes may have some preexisting system to perform attestation. In these cases, the embodiments can leverage them without change to the overall construction of the embodiment.

To avoid dangers of allowing OAuth client applications created by a different organization than the one operating the authorization server, the embodiments require that any such third-party application use multiple factors of authentication where at least one of them is not knowledge-based. This ensures that the third-party application cannot view all inputs necessary to authenticate as an end user. This is done by requiring the user to login to such a third-party application using something the user has or something the user is (like biometric data). The API can support any authentication mechanism as such, but, in the case of third-party application usage, it requires at least some form of strong authentication that cannot be impersonated by a rouge application.

Furthermore, the OAuth and OpenID Connect standards allow for an interactive user consent step to take place prior to issuing an AT. This may take place between steps F and G in FIG. 1. When it does and when the client application is provided by a third-party, the embodiments ensure that consent must be digitally signed or approved by some out-of-band mechanism that authenticates the end user using some form of credential that is not knowledge-based. The digital signing or out-of-band approval requires the user to authenticate themselves using some factor of authentication consisting of something the user has or is. As a result, the consent step cannot be impersonated by a rouge application. This differs from the current approaches as discussed above.

The person skilled in the art realizes that the present embodiments by no means are limited to the preferred embodiments described above. On the contrary, many modifications and variations are possible within the scope of the appended claims. For example, different encoding formats may be used, and the details in the client-server interaction may be modified. In its most general form, the embodiments relate to authentication of a user of an OAuth client by an OAuth authorization server, comprising exposing an authentication state machine, where the states of the state machine are hypermedia-based representations of login resources and transitions between states are represented by hypermedia links, wherein the authentication state machine is exposed to the client by an API adhering to the principles of REpresentational State Transfer (REST). When the final state of the state machine has been reached, a secondary access token is issued to the client, thereby authenticating the user, wherein hypermedia representations which are sent to the client are encoded so as to be readily parsable by the client.

The invention claimed is:
1. A method for authenticating a user of an OAuth client by an OAuth authorization server, the method comprising:
receiving a client attestation token (CAT) from the OAuth client using extensibility mechanisms compliant with an OAuth assertion framework;
receiving a public key (PK) and proof of possession (POP) of a private key paired with the PK from the OAuth client;
verifying the CAT;
issuing an application programming interface (API) access token (AAT) to the OAuth client, the AAT being associated with the verified CAT;
receiving the AAT in return, together with the POP of the private key;
exposing an authentication state machine to the OAuth client by an application programming interface (API) adhering to the principles of REpresentational State Transfer (REST), the authentication state machine having states comprising hypermedia-based representations of login resources, and transitions between states are represented by hypermedia links;
sending to the OAuth client a hypermedia representation of an initial state of the state machine;
within the API, repeating the following steps until a final state is reached:
receiving a hypertext transfer protocol (HTTP) request from the OAuth client for one of the hypermedia representations in the state machine, the request being based on either user interaction or automated logic with the OAuth client;

transitioning to a new state as a result of the received request when the request complies with the predefined requirements necessary to exit the current state; and sending to the OAuth client a hypermedia representation of the new state; and when the final state of the state machine has been reached, issuing a secondary access token, AT, to the OAuth client, thereby authenticating the user, wherein hypermedia representations which are sent to the OAuth client are encoded so as to be readily parsable by the OAuth client.

2. The method according to claim 1, wherein the authentication state machine provides for user authentication using a plurality of credentials, including single and multiple factors of authentication.

3. The method according to claim 1, wherein the states are universally identifiable resources and the links are expressed as Uniform Resource Identifiers (URIs).

4. The method according to claim 1, wherein a content type of each hypermedia representation is determined by HTTP content negotiation.

5. The method according to claim 1, wherein the hypermedia representations are encoded as one of JavaScript Object Notation (JSON) and extensible Markup Language (XML).

6. The method according to claim 1, wherein the hypermedia representation of the initial state includes: a type, sub-properties of the type, a set of possible actions, and a set of links to other hypermedia representations.

7. The method according to claim 1, wherein receiving the CAT from the OAuth client comprises receiving a CAT from the OAuth client obtained using a software component installed on the client by:

receiving a CAT request from the OAuth client;

requesting an attestation from an attestation system available within an execution environment of the OAuth client;

receiving an attestation from the attestation system;

encoding the attestation in a CAT; and posting the CAT to the OAuth client application over a secure channel.

8. The method according to claim 7, wherein the step of encoding the attestation in a CAT involves sending the attestation to the OAuth authorization server and receiving the CAT from the OAuth authorization server.

9. The method according to claim 7, wherein the method further includes:

receiving a CAT challenge from the OAuth client;

sending an attestation challenge to the OAuth client;

receiving a challenge response with the attestation; and issuing the CAT.

10. The method according to claim 7, wherein requesting an attestation from the attestation system available within an execution environment of the OAuth client comprises sending a request to the attestation system from a Software Development Kit (SDK) installed on the OAuth client, the OAuth client being a Web-based OAuth client, the request initiating a process comprising:

requesting a CAT, from the SDK to the authorization server;

receiving, at the SDK from the authorization server, a challenge in the form of a Secret Instruction Set (SIS) to be executed by the SDK;

executing the SIS by the SDK to obtain an encrypted result;

sending the encrypted result from the SDK to the authorization server;

receiving a CAT from the authorization server upon verification of the encrypted result; and posting the CAT to the OAuth client, allowing the OAuth client application to proceed.

11. The method according to claim 7, wherein requesting an attestation from the attestation system available within an execution environment of the OAuth client, wherein the OAuth client is not Web-based, comprises sending a request to a platform-specific attestation system, the request initiating a process comprising:

receiving, from the platform-specific attestation system, a form of attestation, in response to the request;

encoding the form of attestation into a CAT; and posting the CAT to the OAuth client, allowing the OAuth client to proceed.

12. The method according to claim 7, wherein the OAuth client includes an embedded Software Development Kit (SDK), and requesting an attestation comprises sending a request for a challenge to the OAuth server, the request initiating a process comprising:

receiving, at the OAuth client, a challenge from the OAuth server;

requesting, by the embedded SDK to the attestation system, attestation;

receiving attestation at the OAuth client;

sending the attestation from the OAuth client to the OAuth server;

receiving the CAT from the OAuth server; and posting the CAT to the OAuth client, allowing the OAuth client application to proceed.

13. The method according to claim 1, using the OpenID Connect protocol.

14. An OAuth authorization server including functions configured to perform the method of claim 1.

15. The server according to claim 14, embodied an OpenID Connect_provider configured to authenticate a user of a client implementing the OpenID Connect protocol.

16. A method for authenticating a user of an OAuth client by an OAuth authorization server, the method comprising:

receiving a client attestation token (CAT) from the OAuth client obtained using a software component installed on the OAuth client by:

receiving a CAT request from the OAuth client;

requesting an attestation from an attestation system available within an execution environment of the OAuth client;

receiving an attestation from the attestation system;

encoding the attestation in a CAT; and posting the CAT to the OAuth client over a secure channel;

receiving a public key (PK) and proof of possession (POP) of a private key paired with the PK from the OAuth client;

verifying the CAT;

issuing an application programming interface (API) access token (AAT) to the OAuth client, the AAT being associated with the verified CAT;

receiving the AAT in return, together with the POP of the private key;

exposing an authentication state machine to the OAuth client by an application programming interface (API) adhering to the principles of REpresentations State Transfer (REST), the authentication state machine having states comprising hypermedia-based representations of login resources, and transitions between states are represented by hypermedia links;

sending to the OAuth client a hypermedia representation of an initial state of the state machine;

within the API, repeating the following steps until a final state is reached:

receiving a hypertext transfer protocol (HTTP) request from the OAuth client for one of the hypermedia representations in the state machine, the request being based on either user interaction or automated logic with the OAuth client;

transitioning to a new state as a result of the received request when the request complies with the predefined requirements necessary to exit the current state; and sending to the OAuth client a hypermedia representation of the new state; and when the final state of the state machine has been reached, issuing a secondary access token, AT, to the OAuth client, thereby authenticating the user, wherein hypermedia representations which are sent to the OAuth client are encoded so as to be readily parsable by the OAuth client.

* * * * *